A. H. WEGNER.
SYSTEM OF GUN CONTROL.
APPLICATION FILED MAR. 10, 1913.

1,208,425.

Patented Dec. 12, 1916.
8 SHEETS—SHEET 1.

Witnesses.

Inventor:
A. H. Wegner
By J. R. Nottingham
Attorney.

A. H. WEGNER.
SYSTEM OF GUN CONTROL.
APPLICATION FILED MAR. 10, 1913.

1,208,425.

Patented Dec. 12, 1916.
8 SHEETS—SHEET 2.

Inventor
A. H. Wegner.

Witnesses

By J. R. Nottingham
Attorney

UNITED STATES PATENT OFFICE.

ARTHUR HOWARD WEGNER, OF WASHINGTON, DISTRICT OF COLUMBIA, ASSIGNOR TO WEGNER CONTROL SYSTEM, INCORPORATED, OF PORTSMOUTH, NEW HAMPSHIRE, A CORPORATION OF MAINE.

SYSTEM OF GUN CONTROL.

1,208,425. Specification of Letters Patent. Patented Dec. 12, 1916.

Original application filed May 2, 1912, Serial No. 694,687. Divided and this application filed March 10, 1913. Serial No. 753,445.

*To all whom it may concern:*

Be it known that I, ARTHUR H. WEGNER, a citizen of the United States, residing at Washington, in the District of Columbia, have invented certain new and useful Improvements in Systems of Gun Control; and I do hereby declare the following to be a full, clear, and exact description of the invention, such as will enable others skilled in the art to which it appertains to make and use the same.

The invention relates to a system of electrically-controlling the training of guns, especially guns of heavy caliber, wherein the movements, such as elevation and depression, azimuth or right and left deflections, etc., may be transmitted from a single or "master-gun" to a number of other guns in parallel, and it consists of the novel arrangement of certain electrical devices and circuits, whereby the movements necessary to place a gun in position for firing may be automatically transmitted to a series or number of guns.

The invention further consists in providing means for controlling the movements of one or more guns of a series independently of the entire number or series.

The invention still further consists in the construction and general arrangement of the several electrical devices, as will be hereinafter fully described.

Among the objects of the invention is the provision of a system of electrical gun-control, by means of which certain movements of a single or "master-gun" may be automatically transmitted to a number or series of other guns in parallel, thereby dispensing with those members of the gun crews required to elevate and depress the guns, deflect and train the same, except those stationed at the "master gun."

Other objects of the invention will become apparent upon a complete disclosure thereof.

In the drawings Fig. 1ª is a side elevation of the training mechanism, showing one form of arranging the same. Fig. 2ª is a side elevation of the gun-controller mechanism and its arrangement. Fig. 3 is a side elevation of one of the gun-controllers.

In illustrating my invention, I have shown a portion of the breech and carriage of a gun of the ordinary six-inch type now in use, provided with the usual hand-operated mechanism for elevating and depressing the gun and for sight-setting, showing my devices applied thereto for transmitting the movements of a single or "master-gun" to a number of other guns through the medium of suitably-arranged electrical devices and electric circuits, and for convenience and clearness of description, I will describe the various parts of my invention under the following head, viz: gun-control, including circuits and general operation.

*Gun control.*—Under this head is included elevation and depression, and training.

Referring to the several views, the numeral 1 indicates the gun mounted upon the carriage 2, and provided with the usual hand-operated mechanism usually employed on the type of gun hereinbefore referred to for elevating and depressing the gun; for training, and for sight-setting.

Figure 5:
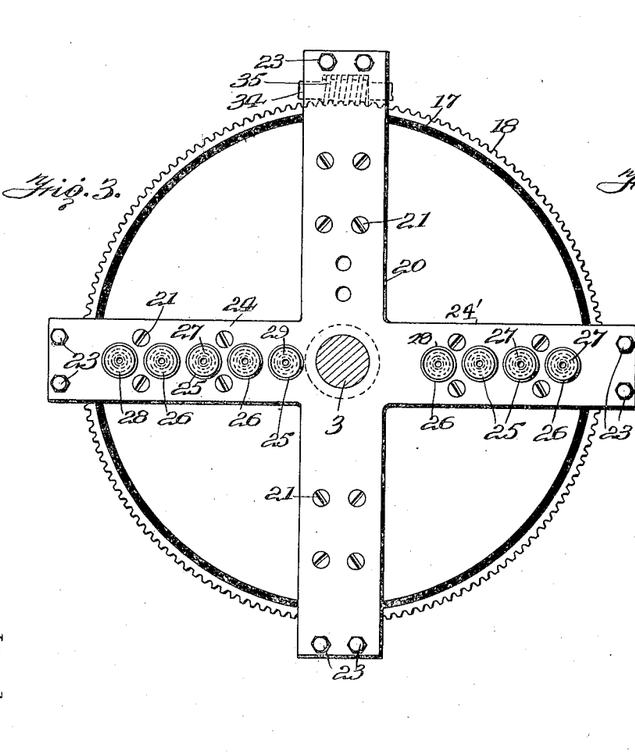
Fig. 5 is a side elevation of one of the contact-dials forming a part of the gun-controller.
Figures 5, 6:
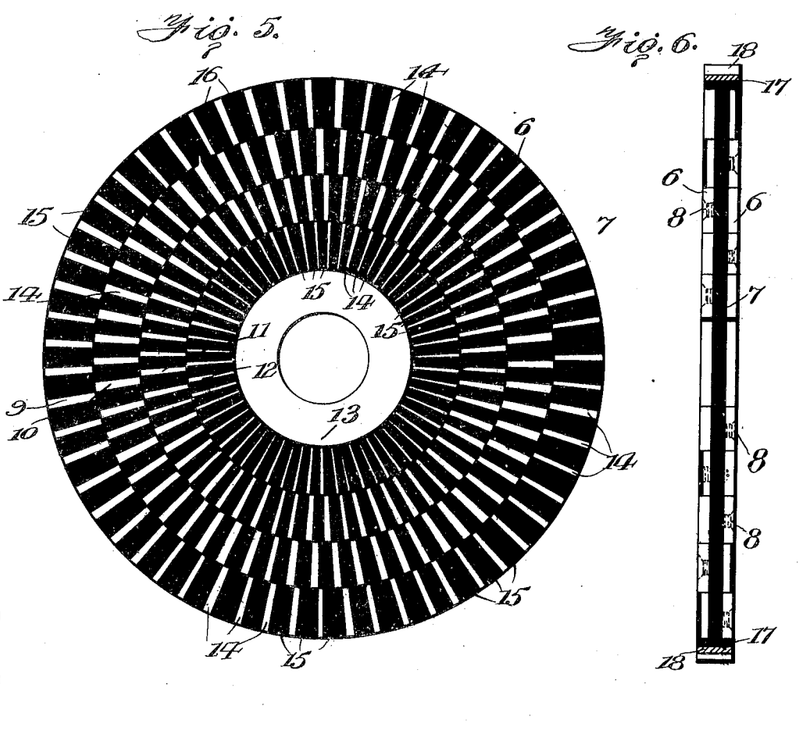
Fig. 6 is a transverse central section of the contact-dials in assembled position.

Mounted on a shaft 3 journaled in brackets 4, 4, secured to the gun-carriage, at any convenient point, is a gun-controller 5, which is composed of two contact-dials 6, 6, see Figs. 5 and 6, secured, one upon either side to a hard rubber disk 7 by screws 8. Each contact-dial, see Fig. 5, is constructed of a number of concentrically-arranged flat metal rings 9, 10, 11, 12, 13, in the present instance five in number, although a greater number may be used to obtain greater accuracy. The inner ring 13, has a smooth, unbroken surface, while the others have one of their faces provided with transverse metal contacts 14 separated from one another by suitable insulating strips or plates 15. In assembling the contact-dials, one is secured to the intervening hard rubber disk one-half of one degree in advance of the other, as shown in Fig. 6.

Figure 7:
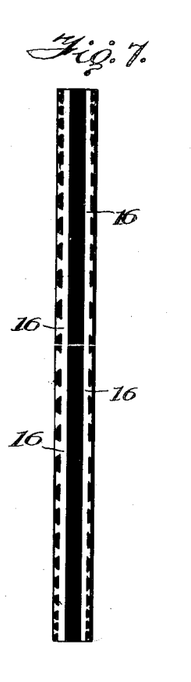
Fig. 7 is an edge view of a modified form of contact-dial.

In the modified form of contact-dials, shown in Fig. 7, the rings are made of hard rubber and have their outer faces inlaid, transversely, with metal strips which serve as contacts 16.

Figure 4:
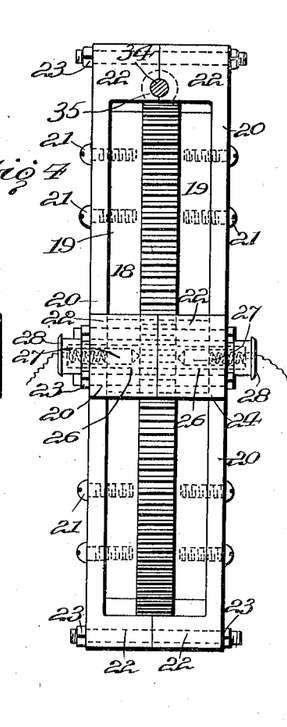
Fig. 4 is an edge view of the same.

The assembled contact-dials are provided, circumferentially, with a hard-rubber band 17, and circumferentially attached to said band is a band-gear 18, see Figs. 3 and 4, the purpose of which will be hereinafter explained. The outer faces of the contact-dials are protected by a casing consisting preferably, of two hard-rubber disks 19, 19, one for each dial, and between said disks the assembled contact-dials are free to revolve, they being fastened to the shaft 3 on which they are mounted. The hard rubber disks 19 are held in place by clamps 20, 20, preferably cross-shape, as shown in Fig. 3, to which said disks are attached by screws 21. The outer ends of the respective arms of the clamps are provided with inwardly-projecting flanges 22, which abut against each other and are firmly held together by bolts 23. Two arms 24, 24', see Fig. 3, of each clamp are provided with a corresponding number of apertures 25 which pass through the casing-disks to the contact-dials, each aperture being lined with a bushing 26 of insulating material. Seated in each aperture 25 is a spring-pressed contact-finger 27 in constant contact with the contact-dials, as shown in Fig. 4. The outer end of each bushing 26 projects a sufficient distance beyond the outer face of the clamps to receive a hard rubber cap 28, centrally perforated to admit an electric conductor. In each arm 24 of the clamps there is an additional aperture 25', which is lined similarly to the aperture 25 and provided with a spring-pressed contact-finger 29 in constant contact with the metal ring 13 and a negative conductor, the conductors of the other contact-fingers being positive.

The casing of the gun-controller, which is mounted on shaft 3, is secured against rotation to the side-bars 30 of a suitable support 31 by stud bolts 32, the support being secured at any convenient place on the gun-mount 33 of the gun-carriage. The upper abutting flanges 22 of the clamps 20 are bored to admit a shaft 34 provided with a worm 35 which operates the contact-dials through the medium of the band gear 18, said shaft 34 being journaled in a support 36 secured to any convenient place on the gun carriage. The shaft 34 is operated by the hand-operated mechanism now in use for elevating and depressing the gun, said mechanism comprising the gear 37 meshing with worm 38 on the operating-shaft 39, and hand wheel 40, as shown in Fig. 1, so that a movement of the hand-wheel 40, in either direction, will cause the dial of the gun-controller to rotate until the proper contact is made between the spring-pressed contact-fingers 27 and one of the metal contacts 14, the movement, depression or elevation, as the case may be, being electrically transmitted to the gun-controllers on the other guns of the series, each gun of the series being provided with a controller electrically-connected with the gun-controller on the master-gun.

Figure 1:
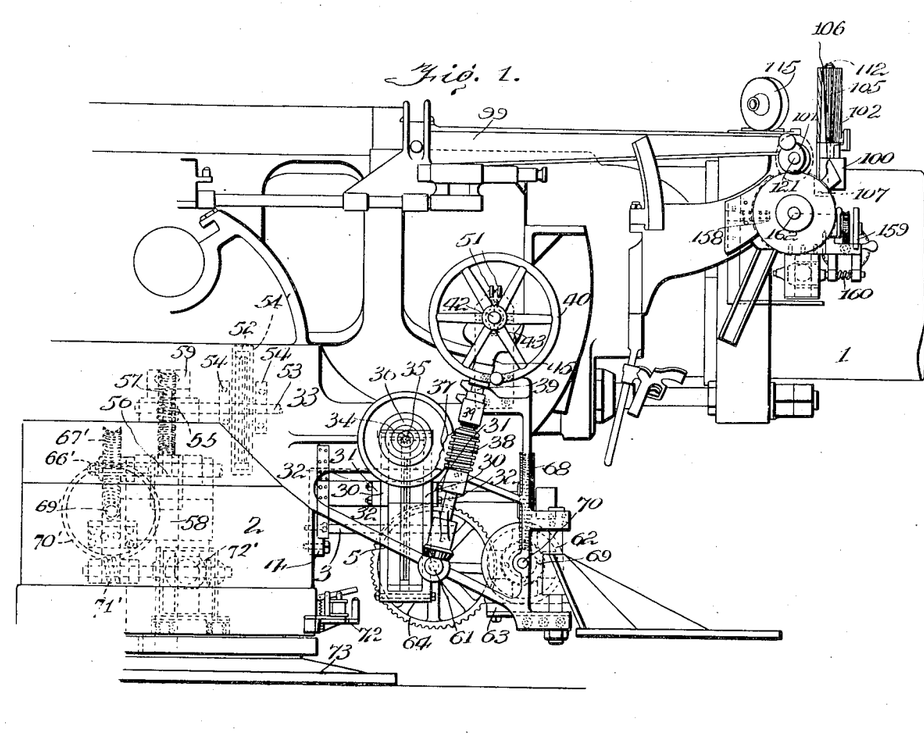
—Figure 1 is a side elevation, in outline, of a portion of the breech of a single or "master-gun", showing some of the mechanisms now employed for elevating and depressing, and training the gun, and my devices applied thereto for transmitting such movements to other guns of a series or group.
Figure 8:
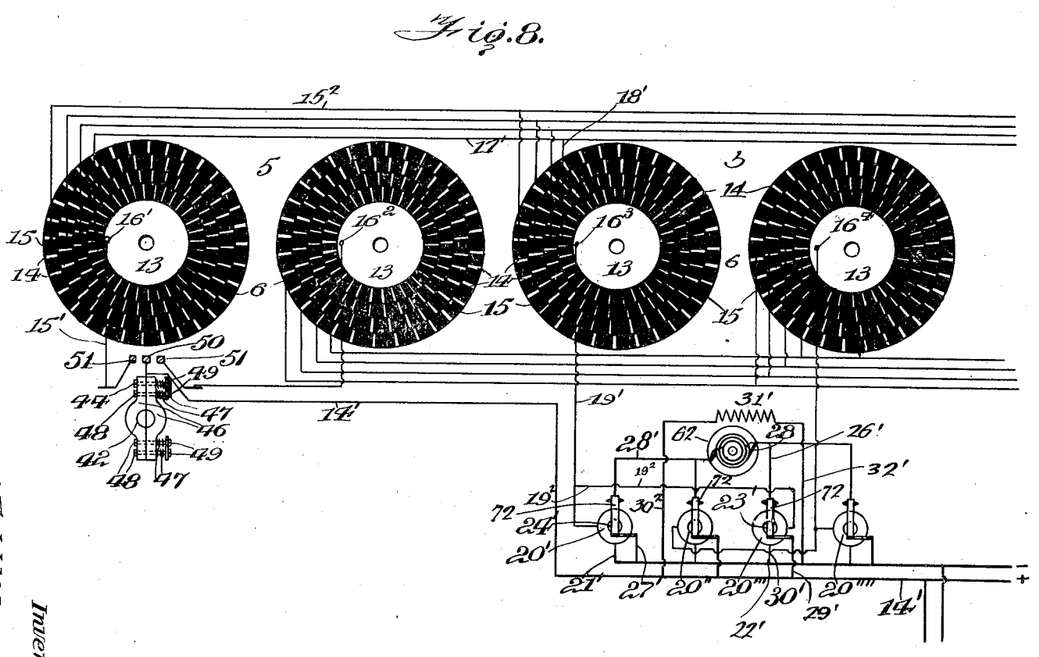
Fig. 8 is a diagrammatic view of circuits and electrical devices for operating the dials of the gun-controllers.

The shaft 42 of the hand-wheel 40 is provided with an extension 43 as indicated in Fig. 1, on which is mounted a friction reversing-switch 44, see Fig. 8, consisting of a base 45, secured to the gun-carriage, and a two-part clamp 46 encircling the shaft extension and held in frictional contact therewith by the tension force of springs 47, 47, which surround the projecting ends of bolts 48, 48, passing through the two-part clamp, as shown in Fig. 8, the tension force of the springs, and thereby the frictional hold on the shaft extension, being regulated by adjusting nuts 49, 49. Projecting from the two-part clamp is a movable contact-block 50 and projecting from the base 45 are two fixed contacts 51, 51, one on each side of the movable contact. As the hand-wheel 40 is turned in either direction contact is made between the movable contact and one or the other of the fixed contacts, the frictional contact between the shaft extension and the two-part clamp being sufficiently great to cause said clamp to move in the direction in which the hand-wheel 40 is turned, but not strong enough to prevent the continued turning of the hand-wheel shaft when contact is made between the movable contact and either of the fixed contacts.

In Fig. 8 the reference characters 20', 20$^2$, 20$^3$, and 20$^4$, indicate, respectively, the coils of four solenoid-switches 72, two for controlling elevation and two for controlling depression, each gun of a group of two or more guns being provided with two for each movement, one being shown on the gun-mount 73 of the gun-carriage. In the present instance, these solenoid-switches are of the single-pole type, as shown in Figs. 9 to 12 inclusive, but it will be obvious that double-pole switches may be employed, in which case but one will be required for each movement.

The operation of the controller-dials is shown in the diagrammatic view Fig. 8, and is as follows: Assuming that the two dials at the right of the figure, which are respectively the front and back of one of the dials 6, represent the gun to be controlled, and the two dials at the left to represent the controlling gun, which for convenience of description will be hereinafter referred to as the "master pointer," the circuit, on friction switch 44 being made to contact with the left hand contact 51, will be established through conductor 14′ and said contact 51; through the conductor 15′ to one of the positive metal contacts of one of the four rings composing the front of the dial, (contacts 16′, $16^2$, $16^3$, $16^4$ corresponding to negative contact 29, being always in contact with the common contact ring 13); passing from the particular metal contact of the particular ring to which the current has passed, the current, say for example, passes over conductors 17′ and 18′ to the front of the dial representing the gun to be controlled, where a circuit is formed, in one direction, over conductors 19′ and $19^2$; through switch-coils 20′ and $20^3$ of solenoid-switches 72 of said coils, and thence over conductors 21′ and 22′ to the negative side of the line. In the reverse direction the circuit is through switch-coils $20^2$ and $20^4$ of the solenoid-switches 72. The passage of current through coils 20′ and $20^3$ closes the corresponding switches 72 and this establishes a current from the positive main through 29′, switch 72 and lead 26′ to the armature of the motor and through lead 28′, switch 72 and lead 27′ to the negative main. This produces rotation of the motor armature in a direction to elevate the gun. The circuit being thus established, and the master-gun elevated or depressed, as the case may be, by the hand-operated mechanism, the controller-dial, through its gearing, is caused to revolve. When the controller-dial has turned one division, termed a degree, the contact comes onto an insulation strip, opening the circuit and causing the solenoid-switch to become deënergized, and causing the motor to cease running. It will be noted that the movement of the master-gun is necessarily slow, being governed by the hand-operated mechanism, and therefore the form of dials shown are made for a slow and positive movement, and the limit contacts are spaced accordingly, in fact the system is termed a "limit system," the limit of movement being controlled by the master-gun. For a fast movement the contacts would necessarily be of a different shape. After each operation the movable contact-block 50 is returned to normal position by a reverse turning of the hand-wheel 40, it being understood that the master-gun only is provided with a reversing-switch which is situated on the shaft of the hand-wheel 40, and can readily be opened or closed, as the case may be, by the hand of the operator having charge of the master-gun. In the reverse action, the circuit is established in the same manner as above described, but through the backs of the dials instead of through the fronts thereof. The field circuit is across the line from positive side through $30^2$, through field coil 31′, and conductor 32′ to negative side of the line.

All of the parts comprising the reversing switch are thoroughly insulated from the gun and carriage.

Training the gun is effected in much the same manner as elevation and depression, with a slight change in the gear-mechanism employed.

Figure 1A:
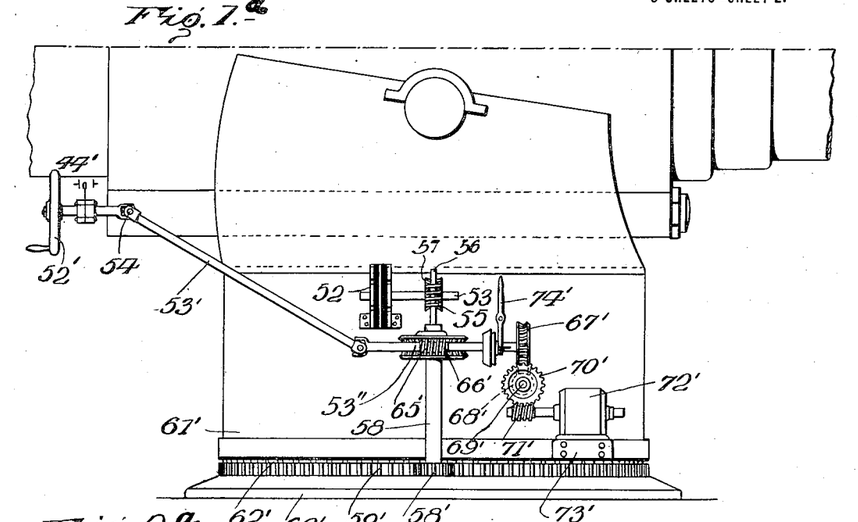
Figure 2:
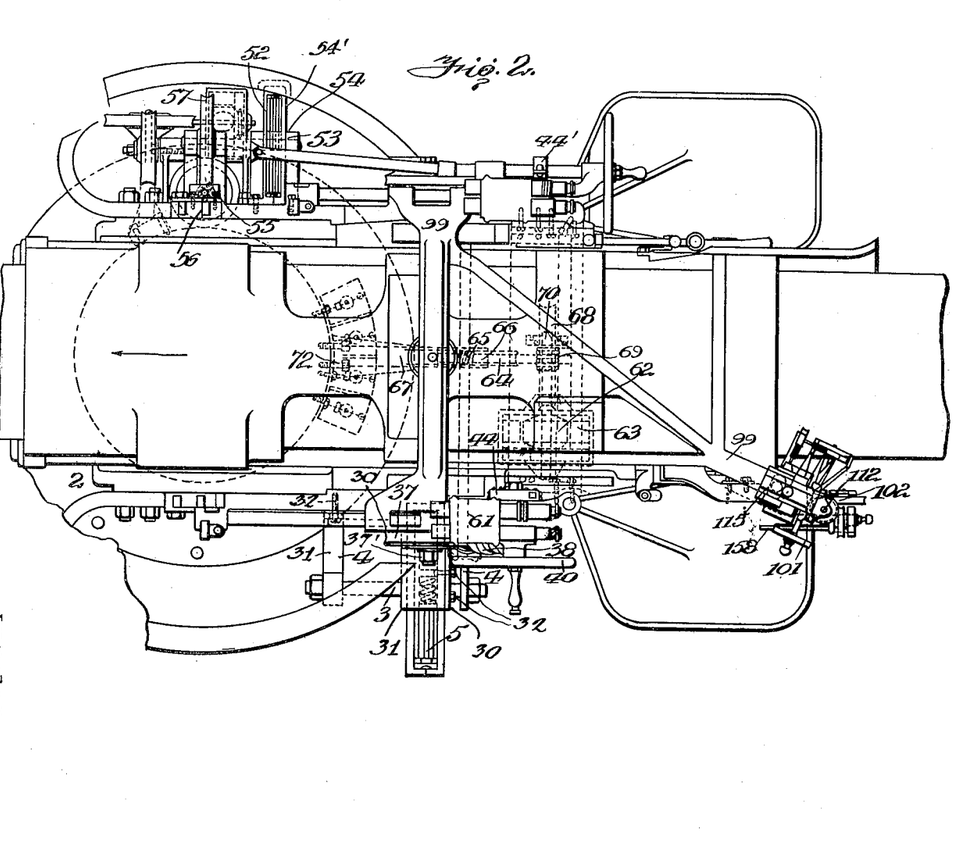
Fig. 2 is a top plan view of the mechanism.
Figure 2A:
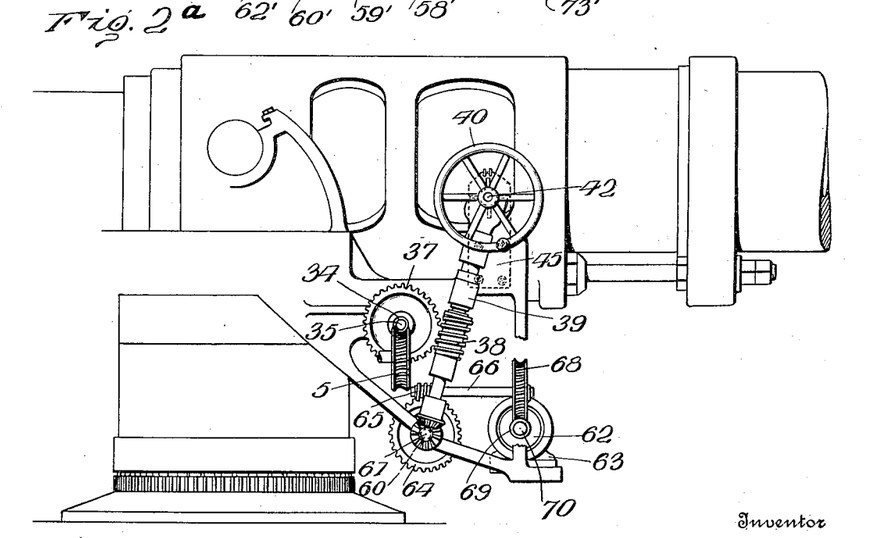

A training-controller 52, similar in construction to the gun-controller, is located at each gun, being mounted on a shaft 53 journaled in suitable supports 54 secured to the gun-carriage at any convenient place, see Figs. 1 and 2, the contact dials of said training-controller being fixed on the shaft 53, so as to be independent of its casing, the side bars 54′ of which are held in fixed position by a support and stud-bolts similar to the support (31) and stud bolts (32) for holding the casing of the elevation controller against rotation. The shaft 53 and the dials of the controller are rotated by a worm 55, carried by a shaft 56, meshing with a gear 57 mounted on said shaft 53, the shaft 56 receiving motion from the shaft 58 which rotates the gun and of which the shaft 56 is an extension, as shown in Figs. 1 and $1^a$, the outer end of said shaft 56 being journaled in a support 59 secured to the gun-carriage. Thus it will be seen that the movements made in training the master-gun by the usual hand-operated mechanism such as shown in Fig. $1^a$, consisting of the worm-gear 65′, 66′, for transmitting power to the gun-shaft 58, coupled to the shaft of the hand-wheel 52′ by the connecting-link 53′, will be transmitted to the training-controller which, in turn, will transmit said movement to the other guns of the group or series through the medium of similarly constructed training-controllers with which said other guns are provided, and which are in electrical communication with the training-controller 52.

Mounted on the shaft $53^2$, coupled to link 53′, is a gear-wheel 67′, meshing with a worm 68′ mounted on a shaft 69′ and on said shaft is a gear-wheel 70′ meshing with a worm 71′, secured on the shaft of an electric motor 72′ secured on a base 73′ fastened to the gun-carriage, so that it will be seen that the gun may be rotated either to the right or left, as the case may be, either by hand or by the electric motor, by the use of an ordinary clutch-mechanism 74′ employed to cut out either one or the other. A suitable friction-reversing switch 44′, similar in all respects to the friction-reversing switch 44 may be employed to change the direction of the current, the operation of the switch being the same as switch 44.

It will be understood that the location of the gun and training-controllers, and their respective gearing-mechanisms, is not material to my system of electric gun-control, so long as they are situated in a position to have their contact-dials geared with the respective hand-operated mechanisms for the elevation, depression, and training of the master-gun.

Having described the several devices, the gun and training-controllers, and the friction-reversing switches, to be applied to the master-gun, I will now proceed to describe the various devices with which I provide the other guns of the group to be controlled by the master-gun, using as an illustration gun No. 2 of the group, it being understood that the remaining guns of the group are provided with the same devices and electrical connections.

Suitably supported beneath each gun of the group, exclusive of the master-gun, is a shaft 61 revoluble in either direction to elevate and depress the gun by an electric motor 62 through the medium of suitable mechanisms to be presently described. The motor is mounted upon a platform 63 fastened to and moving with the gun-carriage. The shaft 61 is provided with a gear 64 which meshes with a worm 65 on a shaft 66, said worm being held in place by a support 67, see Fig. 2, secured to the gun-carriage. The shaft 66 is provided with a gear 68 which meshes with a worm 69 on the motor shaft 70, so that the motion imparted to the motor-shaft will be transmitted to shaft 61.

Figure 9:
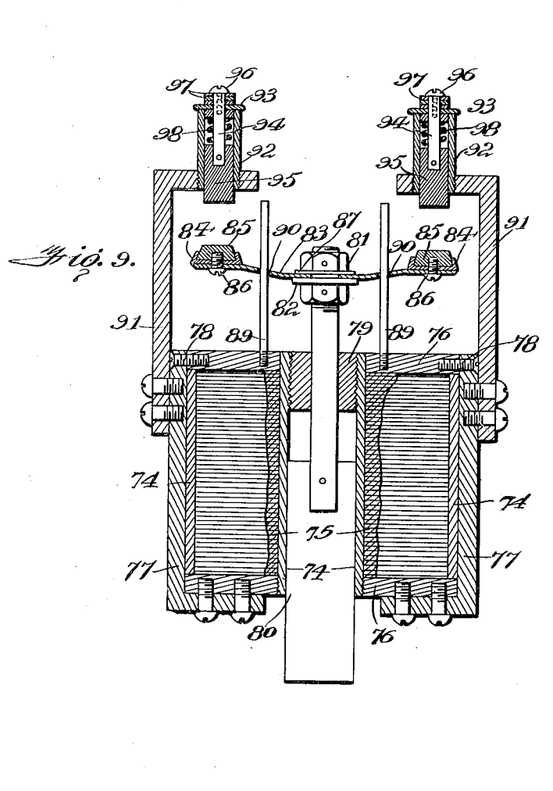
Fig. 9 is a central, vertical section of the solenoid switch.
Figure 10:
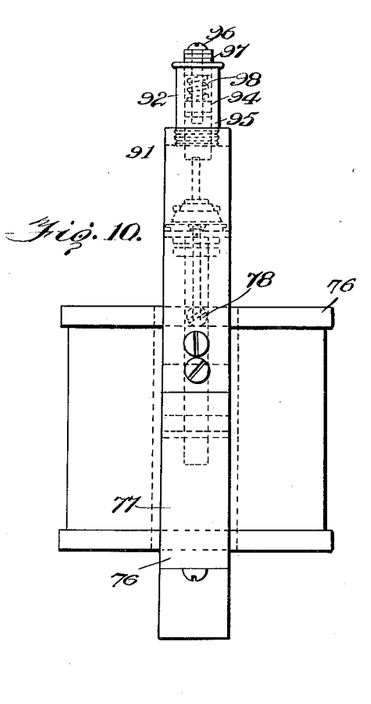
Fig. 10 is a side elevation of the same.
Figure 11:
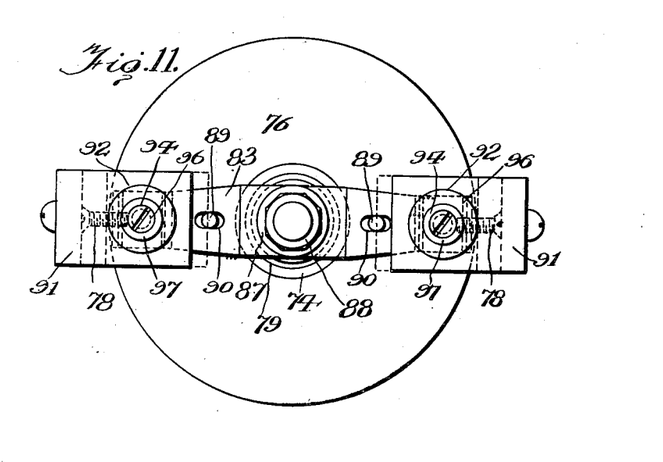
Fig. 11 is a top plan view of the switch.
Figure 12:
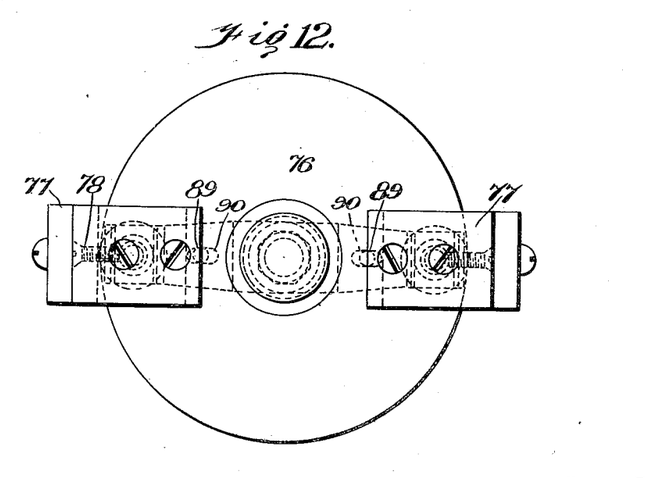
Fig. 12 is a plan view seen from below of Fig. 10.

The numeral 74 indicates a brass plunger-barrel around which a coil 75 of wire, preferably No. 36 silk-covered, is wound, said barrel being provided at each end with a hard rubber disk 76. The outer surface of the coil is covered with a suitable insulating material, as is also its inner surface. The coil is supported in angle-straps 77, 77 and is secured thereto by screws, the upper ends of said angle-straps being secured to the upper disk by screws 78. The plunger barrel is centrally-screw-threaded to receive a screw-threaded plug 79 of soft iron, said plug being centrally perforated to admit the brass stem of a plunger 80 of soft iron. The upper end of the brass stem is provided with two clamping nuts or collars 81 and 82, between which is secured a spring 83, which is provided at each end with a metal cup 84 in which is secured a carbon-contact 85 by a screw 86. The spring is firmly fastened to the brass rod by a washer 87 and a nut or collar 88 secured to said rod.

Two rods 89, 89 are secured in the upper hard rubber disk 76 and passing through slightly elongated apertures 90 in the spring 83, serve to guide the vertical movements of the plunger 80. Fastened to the upper end of each angle-strap is a brass angle-support 91, the horizontal arm of which is provided with a screw-threaded perforation to receive a screw-threaded casing 92, the upper end of which is interiorly screw-threaded to receive a screw-threaded plug 93. This plug is centrally perforated to receive the brass stem 94 of a carbon plunger 95, and the upper end of the brass rod is provided with a screw-threaded perforation to receive a securing-screw 96, washers 97 being provided as clamps for an electric wire. Interposed between the lower end of the plug and the upper end of the carbon-plunger is a spring 98 which, in conjunction with the spring 83, provides a flexible or yielding contact between each plunger and carbon contacts seated in the cup.

In operation, the solenoid switch performs an important function in my system of electric gun-control, for the instant that a coil is energized by a current of electricity, a magnetic influence is set up and the iron plunger is violently moved upward against the plug 79 which has a great attractive force. When the iron plunger is up against the plug, the carbon contacts are moved violently against the carbon plungers, forcing them up against the springs 98 and making an absolute contact between said contacts and carbon plungers. When the contact is broken the tensioned force of the springs cause the carbon-plungers to resume their normal position.

While the switch just described is a single pole, yet, it will be understood that, by using two such solenoid switches they can be operated as double pole, with a minimum amount of current.

Thus it will be seen that the movements of the guns, elevation and depression, and right and left deflection, are controlled by the controller-dials 5 and 52 operated by motor 62 and shaft 58 respectively, and simply consists in causing corresponding contacts to operate through corresponding dials on the several guns, the movements of all the guns, except the "master-pointer" gun, being accomplished by the motors geared to the present training and elevating mechanisms, and when the "master-pointer" gun is trained or elevated, the controller-dials will, at the same time, be moved a corresponding distance, causing electric make and break of the solenoid switches connected to the other guns, and their motors to start or stop, as the desired contacts on the controller-dials correspond, thus a slow movement of the controller-dial on the "master-pointer" gun will make electric contact on the controller-dials of the other guns of the group, at the same time cut in the solenoid switches, the motor continuing to revolve until the corresponding contact is broken and the solenoid switch opened, when the motor stops. Repeating this operation slowly in either direction will keep all the motors in step, and all guns controlled by the "master-pointer" in exact position therewith. It will be understood that when the master-gun or pointer is used, no electric motor will be provided for the same, but will only be provided for the other guns of the group, and when the master-gun or pointer is provided with a motor the hand-operating mechanism will be put out of commission. The motor 62 shown in Figs. 1 and 2, is shown simply to illustrate its position with relation to the guns under control of the master-gun, it not being essential to the successful carrying out of my invention to equip the master-gun with a motor, but it can be so equipped, and any well-known clutch mechanism can be employed to put the hand-operated mechanism out of commission, but when the master-gun is used as the controlling-pointer for the other guns in a group it is not necessary to use the motor, but the other guns of the group must be equipped with motors.

In illustrating my invention I have shown the usual azimuth drum 100, operated by the hand-wheel 101 on shaft 121, and in addition thereto an azimuth drum 102 provided with suitable insulating strips and metal conductors and mounted on the upper end of a bar 105 is a contact 106 adapted to make electrical contact with the said conductors, said bar being supported by a bracket 107 carrying the usual pointer, and the drum 102 being mounted on a shaft 112 which is an extension of the shaft of the drum 100. An electric motor 115 is provided to drive the shaft 112 of the drum 102, and the ordinary range-dial 158 mounted on shaft 162 is also shown in order to show the relation of the devices now in use for depressing and elevating and deflecting the gun, but the drum 102 and motor for driving it form no part of the present invention, as they form the subject-matter of my co-pending application filed May 2, 1912, Serial No. 694,687, of which the present application is a division, which application on June 27, 1916, became Patent 1,189,213.

Having now described my invention, what I claim is:

1. In a system of gun control, the combination with a plurality of guns one of which is provided with means for manually effecting its movements, of electrical devices and connections for effecting corresponding movements of another gun of said plurality.

2. In a system of gun control, the combination with a master gun provided with means for manually effecting its movements, of a series of other guns each having means for electrically effecting its movements, and connections whereby movements of the master gun control the electric operation of the other guns to the same limit as the master gun.

3. In a system of gun control, the combination with a master gun provided with means for manually effecting its movements, of a series of other guns each having means for electrically effecting its movements, and connections whereby movements of the master gun control the electric operation of the other guns to the same limit as said master gun, each of said other guns having means whereby it may be moved independently of the electric devices.

4. The combination with a pair of guns one of which has means for manually moving it, of means for electrically moving the second gun, said means including a range controller comprising a number of isolated areas representing different range units, means for electrically operating said range controller from the first gun, and means whereby said controller may be stopped at a point corresponding to the range of the first gun.

5. A gun control system of the character described comprising first and second guns, the first being manually movable and the second having a motor for moving it, said motor having operating connections with the first gun whereby the second gun is moved continuously to any degree without interruption during the operation of the motor, and means controlled by the first gun for starting the operation of the motor and prescribing the operation of the motor and movement of the second gun to an exact predetermined limit.

6. A gun control system of the character described comprising first and second guns, the first being manually movable and the second having motors for moving it in either one of two directions, said motors having operating connections with the first gun whereby the movements of said second gun may be effected, without interruption, to a selected degree, and means controllable by the first gun for starting the operation of the motors and prescribing the operation thereof and the movements of the second gun to an exact predetermined limit in either one of said two directions of movement.

7. The combination with a gun having a hand wheel for moving it, of a controller geared to be rotated by said wheel, a series of guns each having a motor and a controller, and electrical connections between the controllers of said series and said hand rotated controller.

8. In a system of gun control, the combination with an electrical controller-switch comprising dials having a circular arrangement of contacts, the said dials being operated by the elevating-gear of a gun which is manually controlled and acts as a master-gun to a series of controlled guns, of controller switches at the controlled guns, and motors under control of the controller switches for electrically reproducing the movements of elevation and depression of the master gun in the other guns.

9. In a system of gun control, the combination with an electrical controller-switch comprising dials having a circular arrangement of contacts, the said dials being operated by the elevating gear of a gun which is manually controlled and acts as a master gun to a series of controlled guns, of controller switches at the controlled guns, motors under control of the controller switches for electrically reproducing the movements of elevation and depression of the master gun in the other guns, and an additional electrical controller switch of the dial type on the master gun for transmitting rotary training movements of said master gun to the other guns.

10. In a system of gun control, the combination with an electrical controller switch comprising dials having a circular arrangement of contacts, the said dials being operated by the elevating gear of a gun which is manually controlled and acts as a master gun to a series of controlled guns, of controller switches at the controlled guns, motors under control of the controller switches for electrically reproducing the movements of elevation and depression of the master gun in the other guns, and a reversible switch on the master gun, said switch coöperating with the controller switches for controlling the direction of movement of the other guns.

11. In a system of gun control, the combination with an electrical controller switch comprising dials having a circular arrangement of contacts, the said dials being operated by the elevating gear of a gun which is manually controlled and acts as a master gun to a series of controlled guns, motors under control of the controller switches for electrically reproducing the movements of elevation and depression of the master gun in the other guns, a reversible switch on the master-gun, said switch coöperating with the controller switches for controlling the direction of movement of the other guns, and an additional electrical switch of the dial type on the master gun for transmitting rotary training movements of said master gun to the other guns.

12. In a system of gun control, the combination with an electrical controller switch comprising dials having a circular arrangement of contacts, the said dials being operated by the elevating gear of a gun which is manually controlled and acts as a master gun to a series of controlled guns, motors under control of the controller switch for electrically reproducing the movements of elevation and depression of the master gun in the other guns, and solenoid switches, on the guns under control for energizing and deënergizing the power circuits of the several guns.

13. In a system of gun control, the combination with an electrical controller switch comprising dials having a circular arrangement of contacts, the said dials being operated by the elevating gear of a gun which is manually controlled and acts as a master gun to a series of controlled guns, motors under control of the controller switches for electrically reproducing the movements of elevation and depression of the master gun in the other guns, an additional electrical controller switch of the master gun for transmitting rotary training movements of said master gun to the other guns, and solenoid switches, on the guns under control, for energizing and deënergizing the power circuits of the several guns.

14. In a system of gun control, the combination with an electrical controller-switch comprising dials having a circular arrangement of contacts, the said dials being operated by the elevating gear of a gun which is manually controlled and acts as a master gun to a series of controlled guns, motors under control of the controller switches for electrically reproducing the movements of elevation and depression of the master gun in the other guns, an additional electrical switch of the aforesaid dial type for transmitting rotary training movements of said master gun to the other guns, solenoid switches, on the guns under control, for energizing and deënergizing the power circuits of the several guns, and a reversible switch on the master gun for controlling the direction of the movements of the other guns.

15. A system of gun control wherein there is a master gun or pointer controlling the movements of other guns, and an electrical mechanism for controlling the movement of each individual gun of the series or part of the series to be controlled, as herein set forth.

In testimony whereof I affix my signature, in the presence of two witnesses.

ARTHUR HOWARD WEGNER.

Witnesses:
ELMER J. BURNHAM,
LOTTIE R. WINDRICH.

Copies of this patent may be obtained for five cents each, by addressing the "Commissioner of Patents, Washington, D C."